(12) United States Patent
Mahn

(10) Patent No.: US 8,985,889 B2
(45) Date of Patent: Mar. 24, 2015

(54) SHRINK DISK FOR THE FRICTIONAL CONNECTION OF ROTATING MACHINE PARTS

(75) Inventor: Gunter Mahn, Ziegelheim (DE)

(73) Assignee: Siemens Aktiengesellschaft, München (DE)

( * ) Notice: Subject to any disclaimer, the term of this patent is extended or adjusted under 35 U.S.C. 154(b) by 486 days.

(21) Appl. No.: 13/306,306

(22) Filed: Nov. 29, 2011

(65) Prior Publication Data

US 2012/0301216 A1 Nov. 29, 2012

(30) Foreign Application Priority Data

Nov. 30, 2010 (EP) ...................................... 10015128

(51) Int. Cl.
*F16D 1/093* (2006.01)
*F16D 1/095* (2006.01)

(52) U.S. Cl.
CPC ...................................... *F16D 1/095* (2013.01)
USPC ..................................................... 403/374.1

(58) Field of Classification Search
CPC ........... F16D 1/05; F16D 1/091; F16D 1/093; F16D 1/094; F16D 1/095; F16D 1/096
USPC ................ 403/1, 365–371, 373, 374.1–374.3
See application file for complete search history.

(56) References Cited

U.S. PATENT DOCUMENTS

| | | | |
|---|---|---|---|
| 2,760,800 A | 8/1956 | Wekeman | |
| 3,009,747 A * | 11/1961 | Pitzer | 384/272 |
| 3,434,303 A * | 3/1969 | Leyer | 464/71 |
| 3,865,095 A * | 2/1975 | Helmick | 124/24.1 |
| 3,998,563 A * | 12/1976 | Kloren | 403/370 |
| 4,025,213 A * | 5/1977 | Schafer et al. | 403/370 |
| 4,979,842 A * | 12/1990 | Miller et al. | 403/15 |
| 6,139,215 A * | 10/2000 | Kuhne et al. | 403/337 |

(Continued)

FOREIGN PATENT DOCUMENTS

| | | |
|---|---|---|
| DE | 2514313 | 10/1976 |
| DE | 3100865 A1 | 8/1982 |
| DE | 102004 019424 | 11/2005 |

(Continued)

OTHER PUBLICATIONS

USPTO Translation of DE 2514313, "Clamping Plate for Shaft/Hub Connection", Mar. 2014, Phoenix Translations.*

*Primary Examiner* — Michael P Ferguson
*Assistant Examiner* — Daniel Wiley
(74) *Attorney, Agent, or Firm* — Henry M. Feiereisen LLC

(57) ABSTRACT

A shrink disk for the frictional connection of rotating machine parts comprises at least an outer ring and an inner ring, which are connected together at at least one substantially axially extending conical contact surface. In this case, at least the outer ring or the inner ring comprises two axially spaced-apart ring elements. Furthermore, there is provided at least one intermediate ring which is arranged between the two ring elements, is connected to the ring elements in each case at a substantially radially extending conical contact surface and has a plurality of radially extending through-passage bores and/or threaded bores along its circumference. Furthermore, a plurality of adjusting screws is inserted through openings on the outer ring into the through-passage bores and/or threaded bores. The intermediate ring is radially displaceable and the two ring elements are axially displaceable by rotation of the adjusting screws.

4 Claims, 2 Drawing Sheets

(56) References Cited

U.S. PATENT DOCUMENTS 7,806,618 B2 * 10/2010 Schafer et al. .................. 403/31
2008/0025791 A1    1/2008 Godde

FOREIGN PATENT DOCUMENTS

EP    1884672    2/2008
JP    6249253    9/1994

* cited by examiner

SHRINK DISK FOR THE FRICTIONAL CONNECTION OF ROTATING MACHINE PARTS

CROSS-REFERENCES TO RELATED APPLICATIONS

This application claims the priority of European Patent Application, Serial No. EP 10015128.1, filed Nov. 30, 2010, pursuant to 35 U.S.C. 119(a)-(d), the content of which is incorporated herein by reference in its entirety as if fully set forth herein.

BACKGROUND OF THE INVENTION

The present invention relates to a shrink disk for the frictional connection of rotating machine parts, e.g. shafts, wheel hubs or flanges.

The following discussion of related art is provided to assist the reader in understanding the advantages of the invention, and is not to be construed as an admission that this related art is prior art to this invention.

In order to be assembled and disassembled, conventional shrink disks having axial screwed connections require a comparatively large amount of installation space on account of unfavorable accessibility of the axial screwed connections. For this purpose, at least as much installation space usually has to be present as the axial screwed connections are long. This results in increased necessary shaft lengths, and these in turn lead to increased bending moments. Increased bending moments can be compensated by larger, expensive bearings or cause the bearing service life to be shortened.

It would therefore be desirable and advantageous to provide an improved shrink disk which obviates prior art shortcomings and which requires only a small amount of installation space in order to be assembled or disassembled.

SUMMARY OF THE INVENTION

According to one aspect of the present invention, a shrink disk for the frictional connection of rotating machine parts includes at least an outer ring and an inner ring, which are connected together at at least one substantially axially extending conical contact surface, with at least the outer ring or the inner ring comprising two axially spaced-apart ring elements, at least one intermediate ring arranged between the two ring elements, the intermediate ring being connected to each of the ring elements at a substantially radially extending conical contact surface and having a circumference provided with a plurality of radially extending bores, and a plurality of adjusting screws inserted through openings on the outer ring into the bores, wherein a rotation of the adjusting screws causes a radial displacement of the intermediate ring and an axial displacement of the two ring elements.

As a result of a shrink disk according to the present invention, better accessibility of adjusting screws in shrink disks, in particular on driveshafts between transmissions and motors or working machines is realized. As a result of the improved accessibility of the adjusting screws, installation space can be saved, leading to a reduced axial dimension of a drivetrain.

According to another advantageous feature of the present invention, the outer ring comprises the two axially spaced-apart ring elements. Arranged between the two ring elements of the outer ring are two intermediate rings which are connected to the ring elements, respectively, at a substantially radially extending conical contact surface and have a plurality of radially extending through-passage bores and/or threaded bores along their circumference.

As an alternative, in accordance with another advantageous feature of the present invention, the inner ring may comprise the two axially spaced-apart ring elements. In this case, an intermediate ring is arranged between the two ring elements of the inner ring and connected to the ring elements, respectively, at a substantially radially extending conical contact surface, with the intermediate ring having a plurality of radially extending threaded bores along its circumference.

According to another advantageous feature of the present invention, the outer ring may also comprise two axially spaced-apart ring elements, between which an intermediate ring is arranged. In this case, the intermediate ring is connected to the ring elements, respectively, on a substantially radially extending conical contact surface and has a plurality of radially extending through-passage bores along its circumference.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
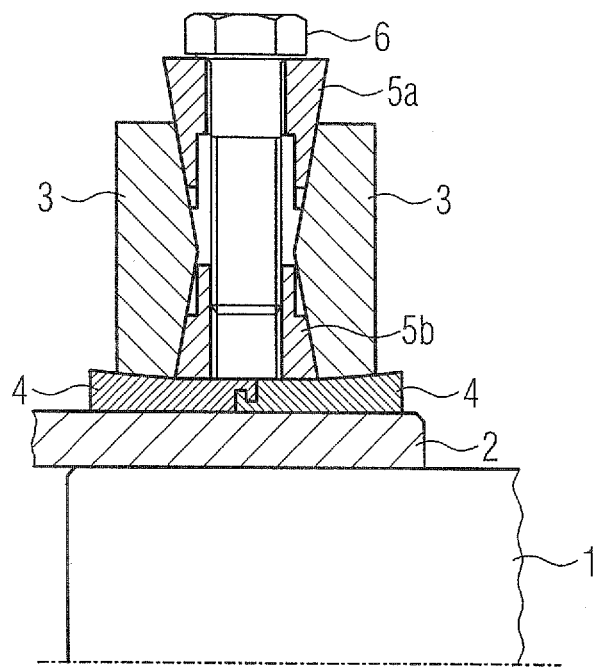
FIG. 1 shows a shrink disk which can be screwed together radially and has a two-part outer ring and also an outer and an inner intermediate ring.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
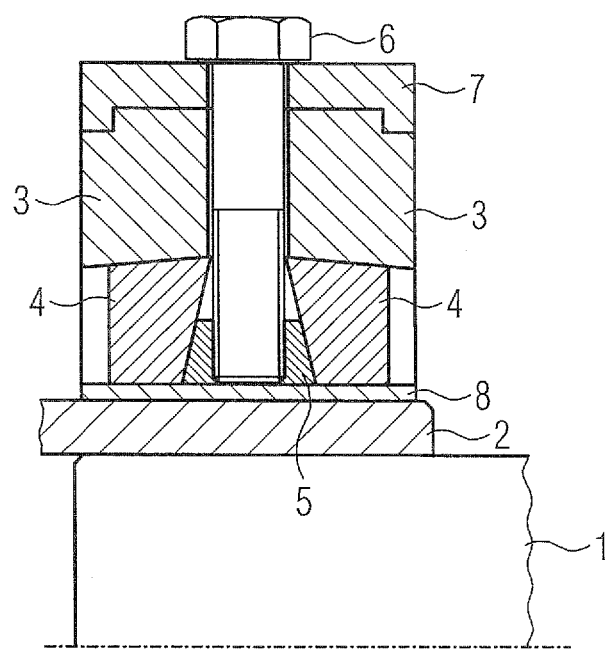
FIG. 2 shows a shrink disk which can be screwed together radially and has a two-part inner ring and an intermediate ring.
Figure 3:
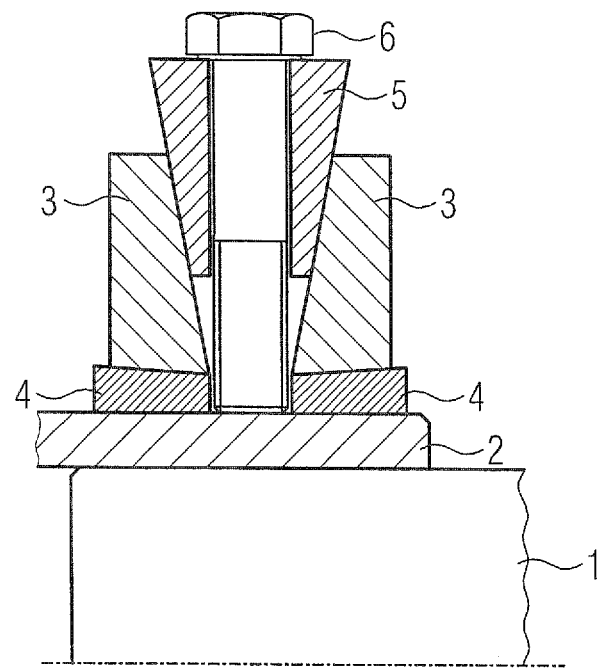
FIG. 3 shows a shrink disk which can be screwed together radially and has a two-part outer ring and an intermediate ring.

All of the shrink disks which are illustrated in FIGS. 1 to 3 for the frictional connection of a shaft 1 to a hollow shaft 2 surrounding it comprise in each case at least an outer ring 3 and an inner ring 4. The outer ring 3 and the inner ring 4 are connected together at at least one substantially axially extending conical contact surface. At least the outer ring 3 or the inner ring 4 comprises two axially spaced-apart ring elements. In accordance with the exemplary embodiment illustrated in FIG. 2, both the outer ring 3 and the inner ring 4 comprise two axially spaced-apart ring elements. In contrast, in the exemplary embodiments illustrated in FIGS. 1 and 3, in each case only the outer ring 3 comprises two axially spaced-apart ring elements.

Furthermore, all of the shrink disks illustrated in FIGS. 1 to 3 have at least one intermediate ring 5, 5a, 5b which is arranged between the two ring elements, is connected to the ring elements in each case at a substantially radially extending conical contact surface and has a plurality of radially extending through-passage bores and/or threaded bores along its circumference. Preferably, the at least one intermediate ring 5, 5a, 5b is slotted or comprises a plurality of separate ring segments. A plurality of adjusting screws 6 are introduced through openings in the outer ring 3 into the through-passage bores and/or threaded bores. The intermediate ring 5, 5a, 5b is radially displaceable and the two ring elements axially displaceable by rotation of the adjusting screws 6. In this case, forces exerted by the adjusting screws 6 are initially diverted in the axial direction, thereby resulting in radial bracing between the outer ring 3 and the inner ring 4. On account of the bracing, the inner ring 4 exerts a high surface pressure on the connection between the shaft 1 and the hollow shaft 2.

In the exemplary embodiment illustrated in FIG. 1, the outer ring 3 comprises two axially spaced-apart ring elements. Arranged between the two ring elements of the outer ring 3 are two intermediate rings 5a, 5b. The two intermediate rings 5a, 5b are connected in each case to the ring elements at a substantially radially extending conical contact surface and have a plurality of radially extending through-passage bores or threaded bores along their circumference. In this case, a first outer intermediate ring 5a has a plurality of radially extending through-passage bores for the adjusting screws 6 along its circumference and forms bearing surfaces for heads of the adjusting screws 6. By contrast, a second inner intermediate ring 5b has a plurality of radially extending threaded bores for the adjusting screws 6 along its circumference. The first intermediate ring 5a has an axial extent that decreases radially inwardly, while the second intermediate ring 5b has an axial extent that decreases radially outwardly. Furthermore, the outer ring 3 has a wall thickness that decreases axially toward its end sides, while the inner ring 4 has a wall thickness that increases axially toward its end sides.

The inner ring 4 of the shrink disk according to FIG. 1 is configured in two parts in the present exemplary embodiment and comprises two ring portions that are connected together. In order that the two ring portions do not move axially outward when the shrink disk is braced, they are connected together by means of a double tongue-and-groove connection. In this case, the two ring portions have in a connecting region in each case a circumferential groove and a tongue which engages into the groove in the other ring portion. In principle, the ring portions could also be connected together by means of a bayonet closure or by adhesive bonding to the hollow shaft 2.

FIG. 2 illustrates an exemplary embodiment in which the outer ring 3 comprises two axially spaced-apart ring elements, the spacing of which is greater than a shank diameter of the adjusting screws 6. The ring elements of the outer ring 3 are surrounded by an outer sleeve 7 that fixes them radially and axially. The outer sleeve 7 has a plurality of radially extending through-passage bores for the adjusting screws 6 along its circumference and forms bearing surfaces for heads of the adjusting screws 6. Furthermore, in the exemplary embodiment illustrated in FIG. 2, the intermediate ring 5 has a plurality of radially extending threaded bores for the adjusting screws 6 along its circumference.

As an alternative to a two-part configuration having two axially spaced-apart ring elements and an outer sleeve 7 fixing them, the outer ring 3 could have a plurality of radially extending through-passage bores for the adjusting screws 6 along its circumference and form bearing surfaces for heads of the adjusting screws 6. In this case, too, the intermediate ring 5 has a plurality of radially extending threaded bores for the adjusting screws 6 along its circumference.

The inner ring 4 of the shrink disk according to FIG. 2 comprises two axially spaced-apart ring elements, between which the intermediate ring 5 is arranged. In this case, the intermediate ring 5 is connected in each case to the ring elements of the inner ring 4 at a substantially radially extending conical contact surface. In addition, the intermediate ring 5 has an axial extent that decreases radially outwardly. Moreover, the outer ring 3 of the shrink disk illustrated in FIG. 2 has a wall thickness that increases axially toward its end sides, while the inner ring 4 has a wall thickness that decreases axially toward its end sides. Furthermore, on an inner wall of the inner ring 3 there is provided an inner sleeve 8 as a connecting element to the hollow shaft 2 and the shaft 1 to be frictionally connected thereto. Given an appropriate choice of material for the hollow shaft 2, the inner sleeve 8 can also be dispensed with.

In the exemplary embodiment illustrated in FIG. 3, the outer ring 3 comprises two axially spaced-apart ring elements, between which the intermediate ring 5 is arranged. The intermediate ring 5 is connected in each case to the ring elements at a substantially radially extending conical contact surface and has a plurality of radially extending through-passage bores for the adjusting screws 6 along its circumference. Furthermore, in the case of the shrink disk illustrated in FIG. 3, the intermediate ring 5 forms bearing surfaces for heads of the adjusting screws 6. In a manner corresponding thereto, the inner ring 4 has a plurality of radially extending threaded bores for the adjusting screws 6 along its circumference. Moreover, the intermediate ring 5 according to FIG. 3 has an axial extent that decreases radially inwardly. In addition, the outer ring 3 has a wall thickness that decreases axially toward its end sides, while the inner ring 4 has a wall thickness that increases axially toward its end sides.

The inner ring 4 of the shrink disk illustrated in FIG. 3 is preferably configured in two parts and comprises two ring portions which are screwed axially together or are connected together by means of a double tongue-and-groove connection illustrated in FIG. 1. In this way, the outer ring 3 and the intermediate ring 5 can be assembled easily around the inner ring 4.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A shrink disk connecting an inner shaft coaxially within a hollow outer shaft by radially compressing the outer shaft towards a central axis of the inner shaft, said shrink disk comprising:

an outer ring and an inner ring, an inner surface of the inner ring engaging an outer surface of the outer shaft, wherein the outer ring comprises two axially spaced-apart ring elements, and wherein an inner surface of each ring element engages with a respective one of two oppositely tapered surfaces of the inner ring;

an outer intermediate ring and an inner intermediate ring arranged axially between the two ring elements, the outer intermediate ring engaged with an outer tapered surface of the ring elements, the inner intermediate ring engaged with an inner tapered surface of the ring elements, said intermediate rings each having a circumference provided with a plurality of radially extending bores; and a plurality of adjusting screws inserted into the bores, wherein a rotation of the adjusting screws causes a radial displacement of the intermediate rings toward each other, thereby causing an axial displacement of the two ring elements away from each other, such that the engagement of the inner surfaces of each ring element with the respective tapered surfaces of the inner ring causes the inner ring to radially compress the outer shaft into the inner shaft;

wherein the outer intermediate ring forms bearing surfaces for heads of the adjusting screws.

2. The shrink disk of claim 1, wherein the bores comprise through-passage bores and/or threaded bores.

3. The shrink disk of claim 1, wherein the outer intermediate ring has an axial extent that decreases radially inwardly, and wherein the inner intermediate ring has an axial extent that decreases radially outwardly.

4. The shrink disk of claim 3, wherein the outer ring has a wall thickness that decreases axially toward its radial end sides, and wherein the inner ring has a wall thickness that increases axially toward its radial end sides.

\* \* \* \* \*